United States Patent [19]

Catena et al.

[11] Patent Number: 5,338,785
[45] Date of Patent: Aug. 16, 1994

[54] FLEXIBLE PACKAGING PRINTING INK CONTAINING CELLULOSE ACETATE BUTYRATE

[75] Inventors: Robert J. Catena, Belleville; Gastone Artusa, Little Falls; Albert A. Kveglis, Pine Brook; Jason J. Bosco, Carlstadt; Sonia Barreto, Belleville; Mathew C. Mathew, Bloomfield; Mark D. Schneider, Dumont, all of N.J.

[73] Assignee: Sun Chemical Corporation, Fort Lee, N.J.

[21] Appl. No.: 95,647

[22] Filed: Jul. 21, 1993

[51] Int. Cl.$^5$ ............................ C08K 5/05; C08L 1/14
[52] U.S. Cl. .............................. 524/39; 524/391
[58] Field of Search ............................ 524/39, 391

[56] References Cited

U.S. PATENT DOCUMENTS

| | | | |
|---|---|---|---|
| 3,647,454 | 3/1972 | Hunter | 96/67 |
| 4,514,540 | 4/1985 | Peck | 524/514 |
| 4,870,139 | 9/1989 | Kveglis | 525/420 |
| 4,895,888 | 1/1990 | Keaveney | 524/391 |
| 4,937,296 | 6/1990 | Golownia | 525/423 |

*Primary Examiner*—Kriellion S. Morgan
*Attorney, Agent, or Firm*—Jack Matalon

[57] ABSTRACT

A flexible packaging printing ink is formulated from a copolymer of polyetheleneneglycol methacrylate and a polyamide resin, pigment, solvent and cellulose acetate butyrate. The polyamide resin is prepared by condensing a dibasic acid mixture with a diamine mixture. The dibasic acid mixture comprises about 0.5 to 0.8 equivalents of a $C_{20}$-$C_{44}$ dibasic acid mixture comprised of about 60 to 100% dimers, 0 to 40% trimers and 0 to 5% monomers, and about 0.2–0.7 equivalents of at least one $C_6$-$C_{12}$ dibasic acid such as azelaic acid and adipic acid, while the diamine mixture comprises about 0.5–0.8 equivalents of piperazine or a substituted piperazine and the balance comprises at least one $C_2$-$C_{12}$ alkyl diamine such as ethylene diamine.

11 Claims, No Drawings

FLEXIBLE PACKAGING PRINTING INK CONTAINING CELLULOSE ACETATE BUTYRATE

FIELD OF THE INVENTION

This invention relates to flexible packaging printing inks formulated from a copolymer of polyethyleneglycol methacrylate and a polyamide resin, pigment, solvent and cellulose acetate butyrate.

BACKGROUND OF THE INVENTION

Flexible packaging printing inks are typically printed by rotary letterpress printing using flexible rubber plates or by gravure printing using engraved chrome-plated cylinders on a wide variety of substrates, e.g. plastic films such as cellulose acetate, polyethylene, polyethylene terephthalate, polyesters, polystyrene, cellophane, glassine, tissue, aluminum foils, liners, bags, paper labels, box coverings, gift wrappings, etc.

Flexible packaging printing inks are widely used in the graphic arts industry. They offer economy, versatility, quality and simplicity and permit a roll of material to be multi-color printed in a continuous web at speeds of over 300 meters per minute and feed it directly to converting machines for slitting, forming or laminating. However, these inks must be carefully formulated so as to avoid the problems indigenous to these types of inks, e.g. chemical pinholing (failure of the ink to properly wet a plastic film surface), mechanical pinholing (the appearance of the pattern of the etched ink form roller), feathering (the appearance of stringy or ragged edges), mottle (ridged or speckled patterns), precipitation of part of the vehicle, blocking (a sticking or transfer of the image to the underside of the web), adhesion of the ink to the substrate, etc.

The inks of the present invention overcome the printing problems alluded to above because of the unique type of copolymer as well as the cellulose acetate butyrate employed in conjunction with the pigment and the solvent. Prior art inks containing resins such as shellac, nitrocellulose, ethyl cellulose, cellulose acetate propionate, conventional polyamide resins, acrylic and methacrylic resins, ketone resins, polyvinyl chloride, etc. have been found to be clearly disadvantageous in comparison to the inks of the present invention.

DETAILS OF THE INVENTION

The present invention relates to flexible packaging printing inks comprising:

(a) a copolymer of polyethyleneglycol methacrylate and a polyamide resin prepared from the condensation of a dibasic acid mixture with a diamine mixture, said dibasic acid mixture comprising (i) about 0.5–0.8 equivalents of a $C_{20}$–$C_{44}$ dibasic acid mixture comprised of about 60–100% dimers, 0–40% trimers and 0–5% monomers, and (ii) about 0.2–0.7 equivalents of at least one $C_6$–$C_{12}$ dibasic acid, said diamine mixture comprising about 0.5–0.8 equivalents of piperazine or a substituted piperazine and the balance comprising at least one $C_2$–$C_{12}$ alkyl diamine;

(b) a pigment;

(c) a solvent; and (d) cellulose acetate butyrate.

The copolymer is comprised of about 1–5 wt. %, preferably 2–3 wt. %, polyethyleneglycol methacrylate and about 95–99 wt. %, preferably 96–98 wt. % polyamide resin, based on the weight of the copolymer.

Examples of useful $C_{20}$–$C_{44}$ dibasic acid mixtures are soya-derived fatty acids and tall oil-derived fatty acids.

Examples of useful $C_6$–$C_{12}$ dibasic acids include adipic, pimelic, suberic, azelaic, sebacic, etc. Examples of useful $C_2$–$C_{12}$ alkyl diamines include ethylene diamine, propylene diamine, piperazine, diethylene diamine, substituted piperazines such as 1,4-bis(3-aminopropyl)piperazine and dipiperazyl alkanes, etc.

Preferably, the polyamide resin is one wherein: the $C_{20}$–$C_{44}$ dibasic acid mixture is present in an amount of 0.6–0.7 equivalents; the $C_{20}$–$C_{44}$ dibasic acid mixture comprises dimers, trimers and monomers of a $C_{36}$ dibasic acid; the $C_6$–$C_{12}$ dibasic acid comprises 0.25–0.28 equivalents of azelaic acid and 0.0–0.08 equivalents of adipic acid; and the diamine mixture comprises 0.60–0.80 equivalents of piperazine with the balance comprising ethylene diamine.

The polyamide resins employed in preparing the copolymer will typically have weight average molecular weights in the range of 40,000 to 60,000. The copolymer is prepared by reacting about 1–5 wt. %, preferably 2–3 wt. %, of the polyethyleneglycol methacrylate with about 95–99 wt. %, preferably 96–98 wt. %, of the polyamide resin in the presence of 0.01–0.10 wt. %, preferably 0.03–0.04 wt. %, of a peroxide compound and 55–75 wt. %, preferably 60–65 wt. %, of a non-reactive solvent which will dissolve the polyamide resin. The reaction mixture is maintained at a temperature of 80°–100° C. for about two hours until solids in an amount of at least 38 wt. % are produced. If the 38 wt. % minimum solids level is not achieved under such conditions, an additional amount of peroxide compound corresponding to about 25% of the initial amount is added and the reaction mixture is maintained at 80°–100° C. for an additional hour.

Examples of suitable peroxide compounds include acyl peroxides, dialkyl peroxides, peroxy esters, hydroperoxides, such as t-butylperoctoate (which is preferred), urea peroxide, histidine peroxide, t-butylhydroperoxide, peroxybenzoic acid, and the like.

The recurring units present in the copolymer may be represented as follows:

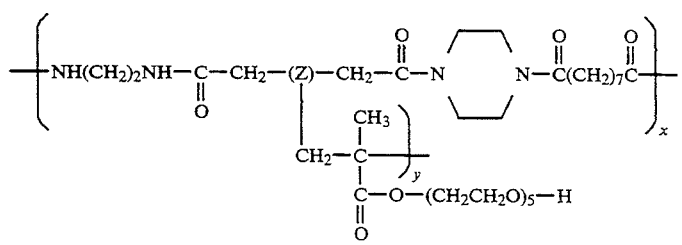

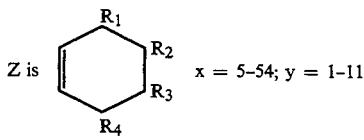 $x = 5-54; y = 1-11$

The "Z" moiety represents a dimer acid in which the $R_1-R_4$ groups contain 5–14 carbon atoms. The nature of the $R_1-R_4$ groups is determined by the type of condensation used to prepare the dimer acid. If head-to-head condensation took place, two adjacent R groups (e.g. $R_1$ and $R_2$ or $R_3$ and $R_4$) are terminated in carboxy groups while the other two adjacent groups will be hydrocarbon terminated. If head-to-tail condensation took place, the R groups alternate in carboxy-terminating and hydrocarbon-terminating groups. The carboxy-terminating groups can have structures such as: $-(CH_2)_8COOH$, $-CH=CH(CH_2)_8COOH$, $-(CH_2)_7COOH$, $-CH_2CH=CH(CH_2)_7COOH$, etc. and the hydrocarbon-terminating groups can have structures such as: $CH_3(CH_2)_4-$, $CH_3(CH_2)_5-$, $CH_3(CH_2)_7-$, $CH_3(CH_2)_4CH=CH-$, etc.

The copolymer is utilized in the ink in an amount of about 5–40 wt. %, preferably 10–30 wt. %, based on the weight of the ink.

The pigment may be any of those which are typically used in flexographic inks such as monoazo yellows (e.g. CI Pigment Yellows 3, 5, 98); diarylide yellows (e.g. CI Pigment Yellows 12, 13, 14); Pyrazolone Orange, Permanent Red 2G, Lithol Rubine 4B, Rubine 2B, Red Lake C, Lithol Red, Permanent Red R, Phthalocyanine Green, Phthalo-cyanine Blue, Permanent Violet, titanium dioxide, carbon black, etc. The pigment is employed in amounts of about 10–45 wt. %, preferably 15–40 wt. %, based on the weight of the ink.

Suitable non-reactive solvents include n-propanol, isopropanol and n-butanol. Preferred solvents are n-propanol and a mixture of n-propanol and n-propyl acetate (the ratio of n-propanol to n-propyl acetate is typically in the range of 1:1 to 10:1 by weight). The solvent is typically employed in an amount of about 35–50 wt. %, preferably 40–45 wt. %, based on the weight of the ink.

The cellulose acetate butyrate is employed in amounts of about 1–5 wt. %, preferably 2–4 wt. %, based on the weight of the ink.

EXAMPLE 1

Synthesis of Copolymer

To a 2-liter, round bottom, 4-neck flask equipped with a nitrogen gas inlet adapter, thermometer, agitator, and Dean-Stark trap with reflux condenser, the following were charged: 98 parts of a polyamide prepared from 186 parts "Empol 1014 Dimer Acid"*, 32.9 parts azelaic acid, 9 parts ethylene diamine, 30.2 parts piperazine and 140 parts n-propanol. The contents were agitated and slowly heated to 90° C. and agitation at this temperature was maintained for 1 hour. Thereafter, a pre-mixed solution of 2 parts of polyethyleneglycol methacrylate, 15 parts of n-propanol and 0.07 part of t-butylperoctoate was added over a period of 1 hour. The reaction mixture was held at 90° C. for an additional 2 hours at which time a "kicker" charge of 0.02 part of t-butylperoctoate was added. The reaction mixture was held at 90° C. for an additional hour and the solids level was determined to be 38±0.5. The product was cooled to 50° C. and discharged. The Brookfield viscosity of the copolymer at 25° C. and 38% solids was 27.5 poise.

*a polymerized fatty acid from Emery Industries, Inc.; the acid has a boiling point of >260° C. @760 mm Hg and a specific gravity of 0.947 @25° C.

EXAMPLE 2

An ink formulation was prepared from the ingredients indicated in Table I below:

TABLE I

| Ink Formulation Ingredients | Wt. % |
| --- | --- |
| n-propanol | 28.0 |
| water | 2.0 |
| CAB varnish* | 10.0 |
| Bon Red pigment | 14.0 |
| aluminum hydrate | 1.0 |
| wax compound | 3.0 |
| Example 1 copolymer | 30.0 |
| heptane | 12.0 |

*cellulose acetate butyrate, 25% in ethanol

Polymer films imprinted with this ink exhibited the following results:

| Film | g/lin. cm. |
| --- | --- |
| Extrusion Bond Strength (2.8 kg/cm², 1 sec., 149° C.) | |
| LCMW[1] | 381 |
| 48 LBT[2] | 889 |
| B-523[3] | 1270 |
| M-44[4] | 2159 |
| Heat Seal Strength | |
| LCMW | 444 |
| 48 LBT | 952 |
| B-523 | 1333 |
| M-44 | 2159 |

| Block Resistance | |
| --- | --- |
| LCMW | no pick - light cling |
| 48 LBT | no pick - light cling |
| B-523 | no pick - no cling |
| M-44 | no pick - no cling |

[1] oriented, corona-treated polypropylene film (Mobil)
[2] corona-treated polyethylene terephthalate polyester (duPont)
[3] oriented, corona-treated polypropylene film (Hercules)
[4] polyvinylidene chloride-coated polyester (coated on one side) (duPont)

EXAMPLE 3

A blue ink formulation was prepared from the ingredients indicated in Table II below:

TABLE II

| Ink Formulation Ingredients | Wt. % |
| --- | --- |
| n-propanol | 25.3 |
| water | 2.0 |
| CAB varnish | 10.0 |
| phthalocyanine blue pigment | 14.3 |
| aluminum hydrate | 0.9 |
| wax compound | 2.7 |
| Example 1 copolymer | 34.0 |
| heptane | 10.8 |

Polymer films imprinted with this ink exhibited properties similar to those of Example 2.

EXAMPLE 4

A yellow ink formulation was prepared from the ingredients indicated in Table III below:

TABLE III

| Ink Formulation Ingredients | Wt. % |
| --- | --- |
| n-propanol | 29.0 |
| water | 2.0 |
| CAB varnish | 9.0 |
| AAOT Yellow pigment | 10.5 |
| aluminum hydrate | 1.0 |
| wax compound | 3.0 |
| Example 1 copolymer | 35.0 |
| heptane | 10.5 |

Polymer films imprinted with this ink exhibited properties similar to those of Example 2.

EXAMPLE 5

A yellow ink formulation was prepared from the ingredients indicated in Table IV below:

TABLE IV

| Ink Formulation Ingredients | Wt. % |
| --- | --- |
| n-propanol | 29.0 |
| water | 2.0 |
| CAB varnish | 9.0 |
| AAOT Yellow pigment | 10.5 |
| aluminum hydrate | 1.0 |
| wax compound | 3.0 |
| Macromelt 6239* | 35.0 |
| heptane | 10.5 |

*a thermoplastic polyamide of dimer acid, azelaic acid, piperazine and ethylene diamine having a melting point of 140° C., an acid number of 2.0 and an amine number of 5.6

The ink formulated from the ingredients listed in Table IV was observed to be excessively high in viscosity. Polymer films imprinted with this ink exhibited poor bond and heat seal strengths:

| Film | g/lin. cm. |
| --- | --- |
| Extrusion Bond Strength (2.8 kg/cm², 1 sec., 149° C.) | |
| LCMW | 254 |
| 48 LBT | 635 |
| B-523 | 1016 |
| M-44 | 1524 |
| Heat Seal Strength | |
| LCMW | 254 |
| 48 LBT | 508 |
| B-523 | 952 |
| M-44 | 1016 |

EXAMPLE 6

A blue ink formulation was prepared from the ingredients indicated in Table V below:

TABLE V

| Ink Formulation Ingredients | Wt. % |
| --- | --- |
| n-propanol | 25.3 |
| water | 2.0 |
| CAB varnish | 7.5 |
| phthalocyanine blue pigment | 14.3 |
| aluminum hydrate | 0.9 |
| wax compound | 2.7 |
| Example 1 copolymer | 34.0 |
| heptane | 10.8 |

EXAMPLE 7

A blue ink formulation was prepared from the ingredients indicated in Table VI below:

TABLE VI

| Ink Formulation Ingredients | Wt. % |
| --- | --- |
| n-propanol | 38.0 |
| n-propyl acetate | 5.0 |
| CAB varnish | 12.0 |
| phthalocyanine blue pigment | 18.0 |
| wax compound | 3.0 |
| Macromelt 6239 | 20.0 |
| ketone resin* | 2.0 |
| adhesion promoter** | 2.0 |

*this resin is a polyketone having a melting point of 110° C., a specific gravity of 1.21 and a hydroxy value of 270; it was utilized as a 60 wt. % solution in a mixture of n-propanol and n-propyl acetate.
**an epoxyethoxy silicone Films imprinted with the inks of Examples 6 and 7 exhibited the properties set forth below:

| | Extrusion Bond Strength (2.8 kg/cm², 1 sec., 149° C.) | |
| --- | --- | --- |
| Film | Example 6 g/lin. cm. | Example 7 g/lin. cm. |
| Treated polyester | 2032 | 127 |
| Treated polypropylene | 381 | 444 |
| LCMW | 559 | 508 |
| 48 LBT | 1778 | 127 |
| B523 | 1270 | 1524 |
| M44 | 2159 | 1397 |

EXAMPLE 8

For comparative purposes, an ink was prepared from the ingredients indicated below in Table VII. The resin which was employed was prepared in accordance with Example 1 of U.S. Pat. No. 4,154,618.

TABLE VII

| Ink Formulation Ingredients | Wt. % |
| --- | --- |
| n-propanol | 28.0 |
| water | 2.0 |
| CAB varnish | 7.5 |
| Blue Shade Watchung Red pigment | 14.0 |
| aluminum hydrate | 1.0 |
| wax compound | 3.0 |
| Resin of Example 1 of U.S. Pat. No. 4,154,618 | 32.5 |
| heptane | 12.0 |

The ink formulation shown in Table VII exhibited no extrusion bond strength when utilized to imprint polyester and polypropylene films.

EXAMPLE 9

Example 8 was repeated except that the resin was replaced with a 50 wt. % n-propanol solution of Versamid® 940—a thermoplastic polyamide resin obtained from Henkel Corporation. This resin is based on dimerized vegetable acid and an aliphatic polyamine and has a Brookfield viscosity @160° C. of 12–18 poise, a softening point of 105°–115° C. and a maximum Gardner color of 7. This ink formulation was used to imprint polyester and polypropylene films. No extrusion bond strength was obtained on polyester films and significantly lower extrusion bond strengths were obtained on polypropylene films in comparison to those obtained using the flexible packaging printing inks of the present invention.

EXAMPLE 10

For comparative purposes, an ink was prepared from the ingredients indicated in Table VII below. The resin which was employed was prepared in accordance with Example 1 of U.S. Pat. No. 4,514,540.

TABLE VII

| Ink Formulation Ingredients | Wt. % |
| --- | --- |
| n-propanol | 28.0 |
| water | 2.0 |
| CAB varnish | 7.5 |
| Bon Red pigment | 14.0 |
| aluminum hydrate | 1.0 |
| wax compound | 3.0 |
| Resin of Example 1 of U.S. Pat. No. 4,514,540* | 32.5 |
| heptane | 12.0 |

*the resin was employed as a 40 wt. % solution in n-propanol

EXAMPLE 11

Example 10 was repeated except that the resin of Example 1 of U.S. Pat. No. 4,514,540 was replaced with the copolymer prepared in accordance with Example 1 of the present specification. The inks of Examples 10 and 11 were then evaluated with the following results:

| | Scotch ® Tape Adhesion, % Removal | |
| --- | --- | --- |
| Film | Example 10 | Example 11 |
| 48 LBT | 100% | 0% |
| M44 | 100% | 0% |
| B523 | 100% | 50% |

| | Extrusion Bond Strength (2.8 kg/cm², 1 sec., 149° C.) | |
| --- | --- | --- |
| Film | Example 10 g/lin. cm. | Example 11 g/lin. cm. |
| 48 LBT | 0 | 1016 |
| M44 | 0 | 1905 |
| B523 | 508 | 1778 |

EXAMPLE 12

The ink formulation shown in Table VIII below was prepared utilizing an epoxy resin in order to show that such ink formulation will not satisfactorily laminate to polymer films (see U.S. Pat. No. 4,937,296). The epoxy resin employed in this ink formulation was Epon ® 1001F obtained from Shell Chemical Co. Such resin is prepared by condensing bisphenol A and epichlorohydrin and has an epoxide equivalent value of 450–525, a melting point of 65°–75° C. and a Gardner-Holdt viscosity of E-J in a test solution at 40% non-volatiles in diethyleneglycol monobutyl ether.

TABLE VIII

| Ink Formulation Ingredients | Wt. % |
| --- | --- |
| Epon ® 1001F | 20.0 |
| ethyl acetate | 55.0 |
| n-propanol | 11.0 |
| Blue Shade Watchung Red pigment | 14.0 |
| | 100.0 |

This ink formulation was evaluated against the ink formulation of Example 11 in respect to tape adhesion and extrusion bond strength:

| | Tape Adhesion - 810 Tape | |
| --- | --- | --- |
| Film | Example 12 | Example 11 |
| 48 LBT | Poor | Excellent |
| B523 | Poor | Excellent |

| | Extrusion Bond Strength (2.8 kg/cm², 1 sec., 149° C.) | |
| --- | --- | --- |
| Film | Example 12 g/lin. cm. | Example 11 g/lin. cm. |
| 48 LBT | 0 | 1016 |
| B523 | 381 | 1778 |

EXAMPLE 13

An ink formulation was prepared utilizing a different epoxy resin in order to show that such ink formulation will not satisfactorily laminate to polymer films (see U.S. Pat. No. 4,937,296). The epoxy resin employed in this ink formulation was Epotuf ® Epoxy Ester Resin 92-737 obtained from Reichold Chemicals, Inc.; such resin is prepared in accordance with Example VIII of U.S. Pat. No. 4,166,504, has an acid number of 58 and a Gardner-Holdt viscosity of $Z_6$–$Z_7$.

TABLE IX

| Ink Formulation Ingredients | Wt. % |
| --- | --- |
| n-propanol | 28.0 |
| water | 2.0 |
| CAB varnish | 7.5 |
| Blue Shade Watchung Red Pigment | 14.0 |
| aluminum hydrate | 1.0 |
| wax compound | 3.0 |
| Epotuf ® 92-737 | 31.5 |
| cobalt drier | 0.5 |
| manganese drier | 0.5 |
| heptane | 12.0 |

The ink formulation shown in Table IX exhibited poor adhesion to polymer films and no extrusion bond strengths.

What is claimed is:

1. A flexible packaging printing ink comprising:
   (a) a copolymer of polyethyleneglycol methacrylate and a polyamide resin, wherein said resin has a weight average molecular weight in the range of 40,000 to 60,000 and is prepared by the condensation of a dibasic acid mixture with a diamine mixture, said dibasic acid mixture comprises: (i) about 0.5–0.8 equivalents of a $C_{20}$–$C_{44}$ dibasic acid mixture comprised of about 60–100% dimers, 0–40% trimers and 0–5% monomers, and (ii) about 0.2–0.7 equivalents of at least one $C_6$–$C_{12}$ dibasic acid, said diamine mixture comprises about 0.5–0.8 equivalents of piperazine or a substituted piperazine and the balance comprises at least one $C_2$–$C_{12}$ alkyl diamine;
   (b) a pigment;
   (c) a solvent selected from the group consisting of n-propanol, isopropanol, n-butanol and a mixture of n-propanol and n-propyl acetate; and
   (d) cellulose acetate butyrate.

2. The ink of claim 1 wherein the copolymer comprises about 1–5 wt. % polyethyleneglycol methacrylate and about 95–99 wt. % polyamide resin, based on the weight of the copolymer.

3. The ink of claim 1 wherein the $C_{20}$–$C_{44}$ dibasic acid mixture comprises dimers, trimers and monomers of a $C_{36}$ dibasic acid.

4. The ink of claim 1 wherein the $C_6$–$C_{12}$ dibasic acid comprises 0.25–0.28 equivalents of azelaic acid and 0.0–0.08 equivalents of adipic acid.

5. The ink of claim 1 wherein the diamine mixture comprises 0.60–0.80 equivalents of piperazine with the balance comprising ethylene diamine.

6. The ink of claim 1 wherein the copolymer is present in an amount of about 5–40 wt. %, based on the weight of the ink.

7. The ink of claim 1 wherein the pigment is present in an amount of about 10–45 wt. %, based on the weight of the ink.

8. The ink of claim 1 wherein the solvent comprises n-propanol.

9. The ink of claim 8 wherein the solvent comprises a mixture of n-propanol and n-propyl acetate.

10. The ink of claim 1 wherein the solvent is present in an amount of about 35–50 wt. %, based on the weight of the ink.

11. The ink of claim 1 wherein the cellulose acetate butyrate is present in an amount of about 1–5 wt. %, based on the weight of the ink.

* * * * *